A. STRAND.
MOTOR CYCLE FRAME.
APPLICATION FILED JUNE 28, 1915.
1,257,761.
Patented Feb. 26, 1918.
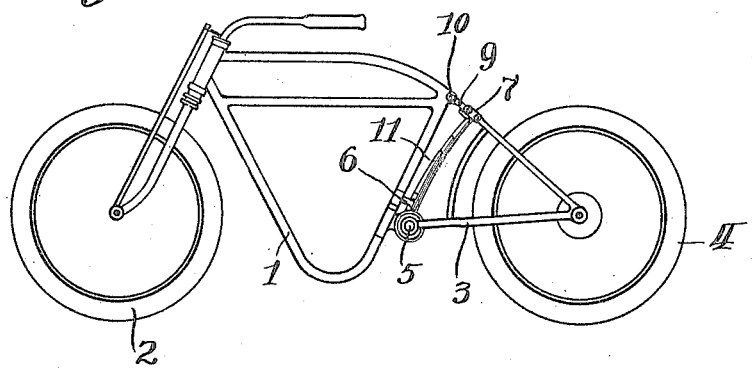
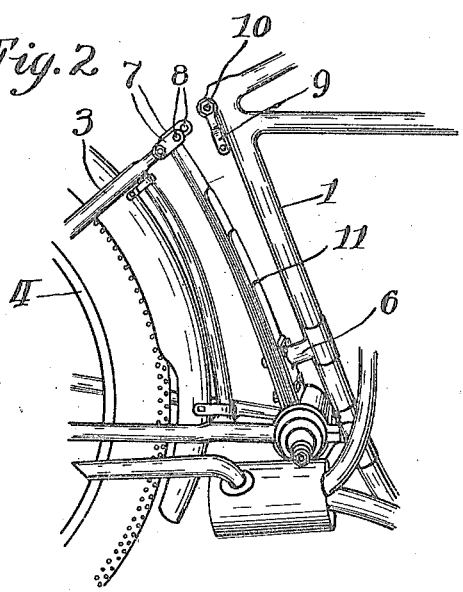
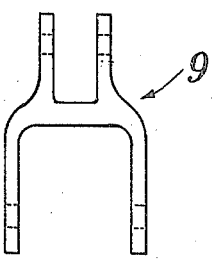
Witnesses:
Benj. F. Beardsley
A. R. Luck
Inventor:
Andrew Strand
by: [signature] Att'y.

UNITED STATES PATENT OFFICE.

ANDREW STRAND, OF MINNEAPOLIS, MINNESOTA.

MOTOR-CYCLE FRAME.

1,257,761. Specification of Letters Patent. Patented Feb. 26, 1918.

Application filed June 23, 1915. Serial No. 36,663.

*To all whom it may concern:*

Be it known that I, ANDREW STRAND, a citizen of the United States, residing at Minneapolis, in the county of Hennepin and State of Minnesota, have invented a new and useful Improvement in Motor-Cycle Frames, of which the following is a specification.

My invention relates to means for providing a spring or rigid frame for bicycles, motorcycles or other similar vehicles, the rider being able at will to have either a spring or rigid frame. Should the spring which gives resiliency to the frame break, the frame can be made rigid very easily and without much, if any, inconvenience to the rider.

A further object of my invention is that my frame is divided into two rigid frames pivoted together and having a cantaliver spring interposed between the two frames. The forward frame carries the front wheel while the rear frame carries the rear wheel, thus giving two rigid frames. The cantaliver spring is rigidly secured to the front frame and pivotally linked to the rear frame. A broad pivotal connection between the two frames and the cantaliver spring prevents the frame from getting out of line. In the drawings forming part of this specification for convenience I have illustrated a motorcycle frame.

Figure 1 is a side elevation of a motorcycle frame.

Fig. 2 is an enlarged detail of the frame.

Fig. 3 is an enlarged view of the connecting link.

The front frame 1 is formed in the usual manner with a series of tubes which are brazed together to form a rigid frame which connects with the fork of usual construction which carries the front wheel 2. The rear frame 3 is also formed of tubing in the shape similar to a triangle making a rigid frame and fork about the rear wheel 4. The frames 1 and 3 are pivoted or hinged together at the point 5 and a cantaliver spring 11 is rigidly bolted to the frame 1 on the bracket 6 at its lower end and is pivotally linked to the rear frame 3 at the top or free end of the spring by links 7. Extending forwardly on the links 7 is a pair of ears 8 which are adapted to receive the ends of a link 9 which is hinged or pivoted to the rear upper part of the frame 1 by bolt 10 and is normally held in the position illustrated in Fig. 2, by the tightening of the bolt 10.

When it is desired to connect the frames 1 and 3 rigidly together the link 9 is turned into the position illustrated in Fig. 1 and the free end of the link 9 is connected with the ears 8 by means of a bolt or in any other suitable manner, thus the frames are held rigidly together and the spring 11 performs no function whatsoever. It is therefore obvious that with this construction of frame that should the spring 11 break or it be desired to have one complete rigid frame about the front and rear wheels it can be easily accomplished by connecting the frames 1 and 3 by means of the link 9.

With my invention on a rough road the rider can enjoy a comfortable spring frame which will not have any tendency to jerk or break the driving chains between the means of power and the driven rear wheel and should he desire to ride faster on a smooth road he can more easily accomplish the same by joining the two frames, making one rigid frame.

While the construction illustrated is preferred, I wish to have it understood that it is only illustrative and may be varied as conditions demand being applied to different types of spring frames within the spirit of the invention, as defined in the pending claims, without departing or sacrificing from the spirit of my invention.

What I claim is:—

1. A vehicle frame, comprising, pivotally connected frame sections, a cantaliver spring interposed between and spacing said frame sections apart, and means for rigidly securing said frame sections together when desired to eliminate the action of said cantaliver spring.

2. A vehicle frame, comprising, pivotally connected frame sections, a cantaliver spring secured to one of said sections at one end and pivotally connected to the other of said sections at its other end and detachable means for connecting said frame sections rigidly together.

3. In a vehicle frame of the character described, comprising, rigid front and rear frame sections pivoted together, a cantaliver spring interposed between said sections and rigidly secured on one end to said front section, a link connected to the free end of said spring and pivoted to said rear frame section, ears projecting from said link and a link pivoted to said front frame section which is adapted to be connected to said ears when it is desired to eliminate the action of said cantaliver spring.

ANDREW STRAND.

Witnesses:
 JAC. BLEKKINK,
 H. L. FISCHER.